United States Patent
Garcia

(10) Patent No.: US 8,615,331 B2
(45) Date of Patent: Dec. 24, 2013

(54) METHOD AND APPARATUS FOR CONTROLLING THE FEED OF REACTIVE POWER IN A WIND POWER GENERATION SYSTEM

(75) Inventor: Jorge Martinez Garcia, Risskov (DK)

(73) Assignee: Vestas Wind Systems A/S, Aarhus N (DK)

( * ) Notice: Subject to any disclaimer, the term of this patent is extended or adjusted under 35 U.S.C. 154(b) by 953 days.

(21) Appl. No.: 12/636,196

(22) Filed: Dec. 11, 2009

(65) Prior Publication Data

US 2010/0148508 A1   Jun. 17, 2010

Related U.S. Application Data

(60) Provisional application No. 61/122,090, filed on Dec. 12, 2008.

(30) Foreign Application Priority Data

Dec. 12, 2008   (DK) .................... 2008 01776

(51) Int. Cl.
- *H02P 9/04* (2006.01)
- *G05F 5/00* (2006.01)
- *G05F 1/70* (2006.01)

(52) U.S. Cl.
CPC *G05F 1/70* (2013.01); *Y02B 70/126* (2013.01)
USPC ............... 700/287; 700/286; 363/37; 363/44; 323/207; 290/44; 290/7

(58) Field of Classification Search
USPC ............................................ 700/287; 290/44
See application file for complete search history.

(56) References Cited

U.S. PATENT DOCUMENTS

| 5,745,368 A | 4/1998 | Ejebe et al. |
| 5,796,628 A | 8/1998 | Chiang et al. |

(Continued)

FOREIGN PATENT DOCUMENTS

| EP | 1 324 458 A2 | 7/2003 |
| EP | 1 855 367 | 11/2007 |

OTHER PUBLICATIONS

Aktarujjaman, M.; Kashem, M.A., Negnevistsky, M.; and Ledwich, G., "Energy Storage System for Reduction of Mid-Line Voltage Variation of a DFIG Wind Turbine Connected to a Weak Grid", 2006, Victoria University, University of Tasmania Research Output Digital Asset Repository, Australia.*

(Continued)

*Primary Examiner* — Mohammad Ali
*Assistant Examiner* — Kelvin Booker
(74) *Attorney, Agent, or Firm* — Patterson & Sherindan, LLP

(57) ABSTRACT

A method and a controller for controlling a wind power generation system is disclosed. The system is connected to a grid at a point of connection, and is devised to feed reactive power to the grid in order to improve grid stability. A Q-V characteristic is determined for the grid at the point of connection as well as a nose point for the Q-V characteristic. A minimum reactive current, $I_{Qmin}$, which is safe from the nose point, is determined, and the feeding of reactive power is controlled such that the reactive current is kept higher than the minimum reactive current. This ensures that the reactive current does not make the Q-V characteristic reverse, and thereby the stability of the system is improved.

20 Claims, 3 Drawing Sheets

(56) References Cited

U.S. PATENT DOCUMENTS

| | | | |
|---|---|---|---|
| 6,670,721 B2 * | 12/2003 | Lof et al. | 290/44 |
| 6,853,094 B2 * | 2/2005 | Feddersen et al. | 290/44 |
| 6,856,040 B2 * | 2/2005 | Feddersen et al. | 290/44 |
| 6,856,041 B2 * | 2/2005 | Siebenthaler et al. | 290/44 |
| 6,933,625 B2 * | 8/2005 | Feddersen et al. | 290/44 |
| 7,015,595 B2 * | 3/2006 | Feddersen et al. | 290/44 |
| 7,087,332 B2 * | 8/2006 | Harris | 429/432 |
| 7,391,126 B2 * | 6/2008 | Liu et al. | 290/44 |
| 7,411,309 B2 * | 8/2008 | Hudson | 290/44 |
| 7,680,562 B2 * | 3/2010 | Delmerico et al. | 700/297 |
| 7,948,102 B2 * | 5/2011 | Schubert et al. | 290/44 |
| 7,966,103 B2 * | 6/2011 | Jorgensen et al. | 700/297 |
| 8,120,932 B2 * | 2/2012 | Folts et al. | 363/37 |
| 8,198,742 B2 * | 6/2012 | Jorgensen et al. | 290/44 |
| RE43,698 E * | 10/2012 | Hudson | 290/44 |
| 8,390,138 B2 * | 3/2013 | Fortmann et al. | 290/44 |
| 2003/0011348 A1 * | 1/2003 | Lof et al. | 322/37 |
| 2003/0151259 A1 * | 8/2003 | Feddersen et al. | 290/44 |
| 2004/0021445 A1 * | 2/2004 | Harris | 320/136 |
| 2004/0217594 A1 * | 11/2004 | Feddersen et al. | 290/44 |
| 2004/0217595 A1 * | 11/2004 | Feddersen et al. | 290/44 |
| 2004/0217596 A1 * | 11/2004 | Feddersen et al. | 290/44 |
| 2004/0222642 A1 * | 11/2004 | Siebenthaler et al. | 290/44 |
| 2005/0033480 A1 | 2/2005 | Schlueter et al. | |
| 2005/0146141 A1 * | 7/2005 | Basteck | 290/44 |
| 2007/0052244 A1 * | 3/2007 | Hudson | 290/44 |
| 2007/0055408 A1 * | 3/2007 | Delmerico et al. | 700/286 |
| 2007/0216164 A1 | 9/2007 | Rivas et al. | |
| 2008/0001408 A1 * | 1/2008 | Liu et al. | 290/44 |
| 2009/0206606 A1 * | 8/2009 | Jorgensen et al. | 290/44 |
| 2010/0002475 A1 * | 1/2010 | Folts et al. | 363/37 |
| 2010/0045040 A1 * | 2/2010 | Bendixen et al. | 290/44 |
| 2010/0292852 A1 * | 11/2010 | Gertmar et al. | 700/287 |
| 2011/0019443 A1 * | 1/2011 | Arnaltes Gomez et al. | 363/44 |
| 2011/0049903 A1 * | 3/2011 | Jorgensen et al. | 290/55 |
| 2012/0010755 A1 * | 1/2012 | Stapelfeldt | 700/287 |
| 2012/0061964 A1 * | 3/2012 | Kirchner | 290/44 |

OTHER PUBLICATIONS

Feltes, C.; Engelhardt, S.; Kretschmann, J.; Fortmann, J.; Koch, F; and Erlich, I., "High Voltage Ride-Through of DFIG-Based Wind Turbines", Jul. 2008, IEEE PES General Meeting, Pittsburgh, PA, USA.*

Hansen, A.D.; Sorensen, P.; Iov, F.; and Blaabjerg, F., "Centralised Power Control of Wind Farm with Doubly Fed Induction Generators", 2006, Renewable Energy, vol. 31, pp. 935-951.*

Qiao, W., "Integrated Control of Wind Farms, Facts Devices and The Power Network Using Neural Networks and Adaptive Critic Designs", Aug. 2008, Dissertation, Doctor of Philosophy in the School of Electrical and Computer Engineering, Georgia Institute of Technology.*

Qiao W.; Venayagamoorthy, G.K.; and Harley, R.G., "Real-Time Implementation of a STATCOM on a Wind Farm Equipped with Doubly Fed Induction Generators", 2006, IEEE Transactions on Industry Applications, vol. 45, Iss. 1, pp. 98-107.*

Qiao, W.; and Harley, R.G., "Grid Connection Requirements and Solutions for DFIG Wind Turbines", Nov. 2008, IEEE Energy 2030, Atlanta, GA, USA.*

Zhou, P.; He, Y.; Sun, D. and Zhu, J., "Control and Protection of a DFIG-Based Wind Turbine under Unbalanced Grid Voltage Dips", Oct. 2008, IEEE Industry Applications Society Annual Meeting, IAS '08.*

Zhao, J.; Zhang, W.; He, Y. and Hu, J., "Modeling and Control of a Wind-Turbine-Driven DFIG Incorporating Core Saturation During Grid Voltage Dips", Oct. 2008, International Electrical machines and Systems.*

Wilch, M.; Pappala, V.S.; Singh, S.N. and Erlich, I., "Reactive Power Generation by DFIG Based Wind Farms with AC Grid Connection", Jul. 2007, 2007 IEEE Lausanne Power Tech.*

Ullah, N.R. and Thiringer, T., "Variable Speed Wind Turbines for Power System Stabiility Enhancement", Mar. 2007, IEEE Transactions on Energy Conversion, vol. 22, No. 1.*

Qi, W.; Xiao-hu, C.; Wan-min, F. and Yan-chao, J., "Study of Brushless Doubly-Fed Control for VSCF Wind Power Generation System Connected to Grid", Apr. 2008, Third International Conference on Technologies, DRPT.*

Liserre, M.; Teodorescu, R. and Blaabjerg, F., "Stability of Photovoltaic and Wind Turbine Grid-Connected Inverters for a Large Set of Grid Impedance Values", Jan. 2006, IEEE Transactions on Power Electronics, vol. 21, No. 1.*

Kanellos, F.D.; Papathanassiou, S.A. and Hatziargyriou, N.D., "Dynamic Analysis of a Variable Speed Wind Turbine Equipped with a Volage Source AC/DC/AC Converter Interface and a Reactive Current Control Loop", 2000, $10^{th}$ Mediterranean Electrotechnical Conference, vol. III.*

Chuong, T.T., "Voltage Stability Investigation of Grid Connected Wind Farm", 2008, World Academy of Science, Engineering and Technology, vol. 42.*

Anton Roider; International Search Report and Written Opinion issued in related International Application No. PCT/EP2009/066974; Jun. 17, 2011; 10 pages; European Patent Office.

G. Govinda Rao et al; Model Validation Studies in Obtaining Q-V Characteristics of P-Q Loads in Respect of Reactive Power Management and Voltage Stability; undated; 5 pages.

Ted K. A. Brekken et al; Control of a Doubly Fed Induction Wind Generator Under Unbalanced Grid Voltage Conditions; Mar. 2007; 7 pages; IEEE Transactions on Energy Conversion, vol. 22, No. 1.

M.B. Mohamed et al.; Doubly Fed Induction Generator (DFIG) in Wind Turbine; Modeling and Power Flow Control; 2004; 5 pages; IEEE International Conference on Industrial Technology (ICIT).

Ling Peng et al.; Modeling and Control of Doubly Fed Induction Generator Wind Turbines by Using Causal Ordering Graph During Voltage Dips; undated; 6 pages; Tsinghua University, China; Ecole Centrale de Lille, France.

Marcus V. A. Nunes, et al.; Influence of the Variable-Speed Wind Generator in Transient Stability Margin of the Conventional Generators Integrated in Electrical Grids; Dec. 2004, 10 pages; IEEE Transactions on Energy Conversion, vol. 19, No. 4.

Steffen Hostrup Larsen; Office Action and Search Report issued in related Denmark Application No. PA 2008 01776; Jun. 12, 2009; 5 pages; Denmark Patent and Trademark Office.

* cited by examiner

METHOD AND APPARATUS FOR CONTROLLING THE FEED OF REACTIVE POWER IN A WIND POWER GENERATION SYSTEM

CROSS-REFERENCE TO RELATED APPLICATIONS

This application claims priority under 35 U.S.C. §119(a) to DK Application No. PA 2008 01776, filed Dec. 12, 2008. This application also claims the benefit of U.S. Provisional Application No. 61/122,090, filed Dec. 12, 2008. Each of these applications is incorporated by reference herein in its entirety.

TECHNICAL FIELD

The present disclosure relates to a method for controlling a wind power generation system connected to a grid at a point of connection, wherein the system is devised to feed reactive power to the grid in transient conditions in order to improve grid stability. The disclosure is further related to a corresponding controller.

BACKGROUND

Such a method is shown e.g. in EP1855367. By being able to cope with voltage fluctuations in the grid and supplying reactive power to the grid, the power generation system can improve the overall stability of the grid. One problem associated with such control method is how to avoid situations where the voltage collapses such that the generation system must be disconnected.

SUMMARY

One embodiment in accordance with aspects of the invention is therefore to provide a control method of the initially mentioned kind with improved stability. Such an embodiment achieves improved stability by means of a method as defined in claim 1. More specifically the method involves determining a Q-V characteristic for the grid at the point of connection, and controlling the feeding of reactive power based on the Q-V characteristic. In this way it can be avoided that the controller drives the reactive current to a point where the voltage collapses as a result thereof. This improves the stability of the system.

The method may further involve determining a nose point for the Q-V characteristic and determining a minimum reactive current, $I_{Qmin}$, which is safe from the nose point. The controlling of the feeding of reactive power may then include keeping the reactive current higher than the minimum reactive current. This provides improved reliability, and the minimum reactive currents percentage of the nose point current may be set by a user.

The Q-V characteristic may be determined by injecting a disturbance at the point of connection. This means that the Q-V characteristic can be determined at regular intervals, as there is no need to await a disturbance in the grid.

The feeding of reactive power to the grid may be controlled by controlling rotor currents of a double fed induction generator (DFIG) or, alternatively by controlling switches of an alternating current/direct current/alternating current (AC/DC/AC) converter configuration connecting a generator with the grid. A controller carrying out the method may be readily integrated in the control loops of any such system, since means for controlling the reactive power is already provided for therein.

The method may be used both in transient and steady state conditions, in order to improve grid stability. A controller comprising functional blocks capable of carrying out the actions of the method implies corresponding advantages and may be varied correspondingly.

Such a controller may be included in a wind power generation system.

DETAILED DESCRIPTION

Figure 1:
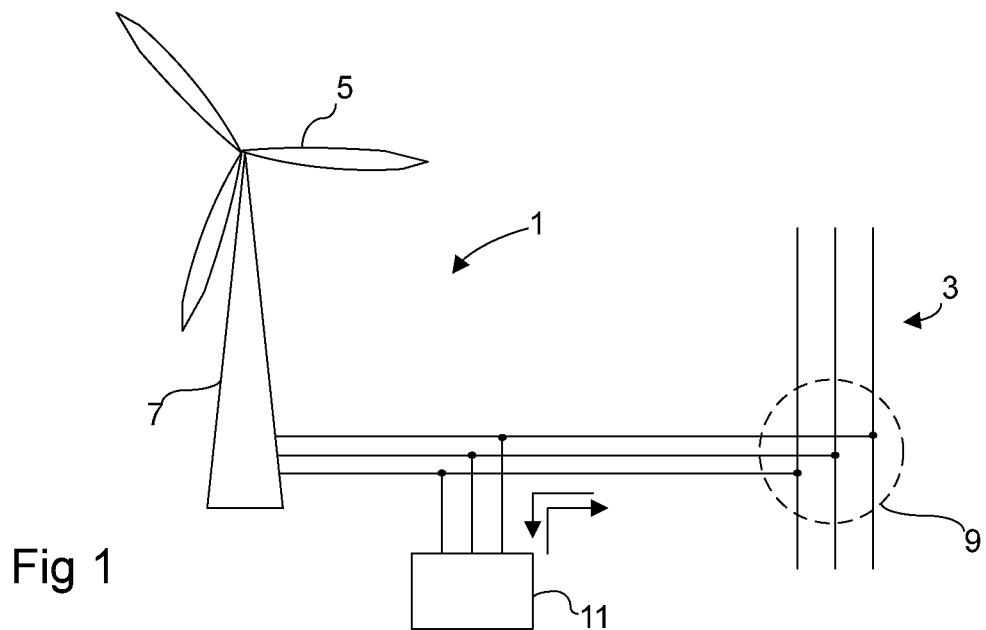
FIG. 1 illustrates a wind power generating system connected to a grid.

FIG. 1 illustrates a wind power generating facility 1 connected to a grid 3. Generally, the facility comprises a turbine 5, including a plurality of blades and being mounted on a tower 7 and connected, often via a gearbox, to a generator in the tower. The generator in turn is connected to the grid 3 with a three phase connection (zero connection not shown) at a point of connection 9, often via a switched converter (not shown), and usually via one or more transformers (not shown).

In the illustrated case, the wind power generating facility 1 has only one turbine 5. However, a wind power generating facility 1 in the context of this disclosure may comprise a plurality of turbines, which may each be mounted on a tower. The wind power generating facility 1 may thus be a wind farm. In addition to the illustrated type of wind turbine, vertical axis turbines are also conceivable.

Grid codes established by authorities and grid operators require that wind power generating facilities are capable of staying connected to the grid during a fault in the grid, which capability is known as low voltage ride through, LVRT. Moreover, the power generating facilities should be able to supply reactive power to or absorb reactive power from the grid during a transient condition. For instance, if a voltage dip occurs due to a fault on one or more grid phases, the power generating facility should be able to supply reactive current to the grid in order to improve stability. Reactive power regulating means 11 is therefore connected to the grid 3 at the point of connection. The reactive power regulating means 11 may be integrated with the energy conversion link in the system or may be provided as a separate auxiliary unit. Various ways of regulating reactive power in accordance with aspects of the present disclosure will be described later, in connection with FIGS. 4 and 5.

In this disclosure, a transient condition refers not only to voltage dips in the grid, but to any sudden change in grid parameters that can be affected by injecting or absorbing reactive power to or from the grid at the point of connection. Thus, for instance a voltage surge is also included.

Figure 2:
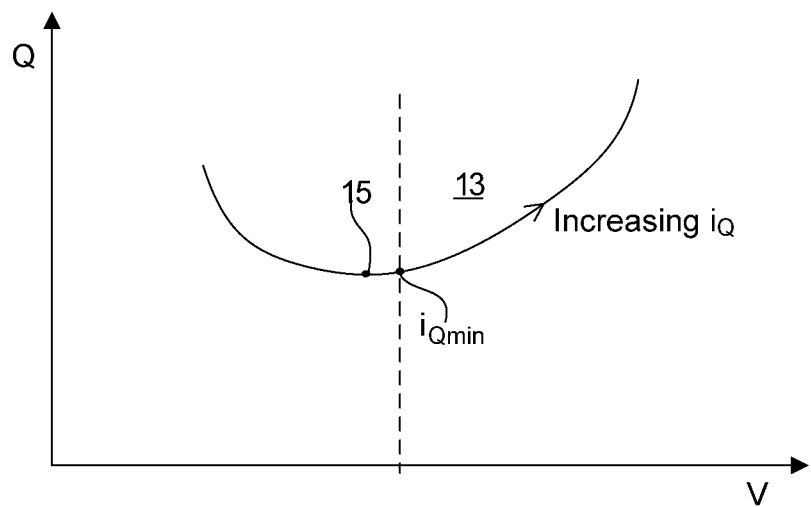
FIG. 2 illustrates a Q-V characteristic.

FIG. 2 illustrates a Q-V characteristic 13 for a typical connection point of a grid. In this disclosure, Q relates to the amount of reactive power (VAr) injected to or absorbed from the grid by adding or subtracting reactive current at the point of connection to the grid. V relates to the grid voltage at the point of connection. The Q-V characteristic shows the relation between the two parameters. The characteristic is, for higher added reactive currents, relatively linear. As can be seen in FIG. 2, the voltage (V) increases with increasing reactive current ($i_Q$) from a minimum reactive current ($i_{Qmin}$). However, the Q-V curve as a whole has a parabolic nature. Consequently, at a point 15 of the Q-V characteristic, dV/dQ is zero. This point is called a nose point 15, and the present characteristics of the grid determine where the nose point 15 is situated. Below this point, an increase in added reactive current will decrease the voltage instead of increasing it, and such an increase in added reactive current would consequently worsen the state of the grid.

Figure 3:
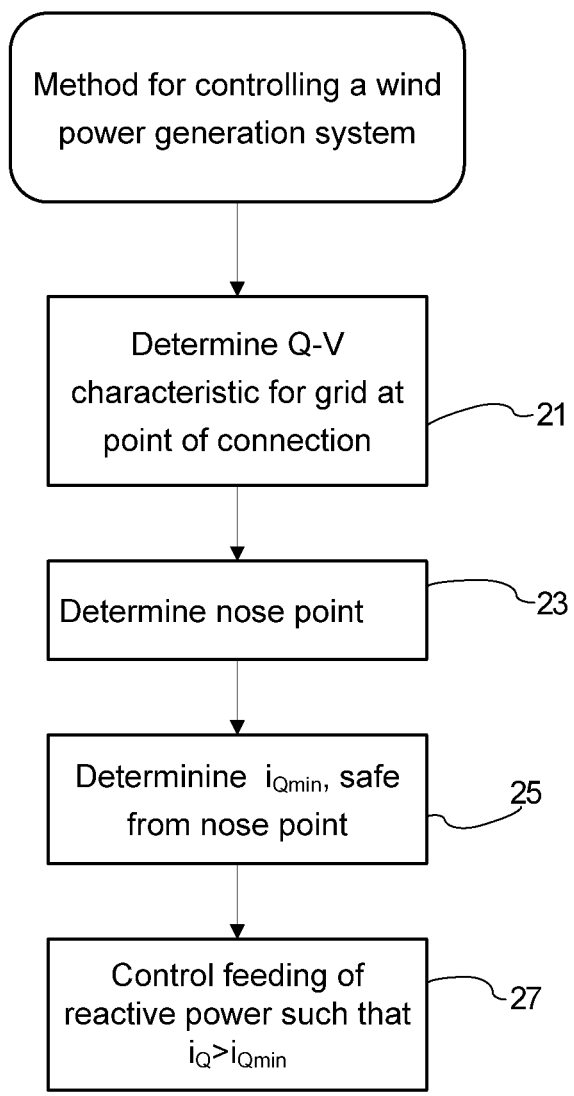
FIG. 3 illustrates a flow chart for a control method.

Therefore, embodiments in accordance with aspects of the invention provide a control method where the provision of reactive power is controlled so as to be kept at a safe part of the Q-V characteristics, where a certain margin to the nose point is provided. This means that the risk of the wind power generation system worsening the state of the grid is more or less eliminated. FIG. 3 illustrates a flow chart for an exemplary control method.

Firstly, the Q-V characteristic for the grid at the point of connection is determined 21. For any given active power level, the Q-V-curve in the desired operating range resembles a parabolic function with the form:

$$aQ = V^2 + bV + c$$

By injecting a disturbance, typically by increasing the injected reactive current, the parameters a, b, and c can be determined. It is however also possible to utilize other disturbances in the system, e.g. a voltage drop to determine the characteristic.

The nose point for the Q-V characteristic is determined 23. This can be done simply by finding the point on the characteristic where dQ/dV is zero which is a very simple operation.

Then, thirdly, a minimum reactive current, $I_{Qmin}$, is determined 25. This current should be safe from the nose point, i.e., in some distance from and above the nose point, typically meaning that $I_{Qmin}$ is 110% of the current that corresponds to the nose point. However, this percentage is only an example and may be varied in accordance with grid stability requirements or operator settings. Hereby, the operation is kept at points of the Q-V characteristic at reactive currents $I_Q$ greater than the minimum reactive current $I_{Qmin}$ so that the voltage V is kept higher than the voltage corresponding to the nose point. Hereby, it is ensured that an increase in added reactive current will increase the voltage.

Then the controller is set 27 to provide $I_{Qmin}$ as a minimum reactive current, such that the added reactive current is kept higher than the level providing the minimum reactive current even during a LVRT condition.

Figure 6:
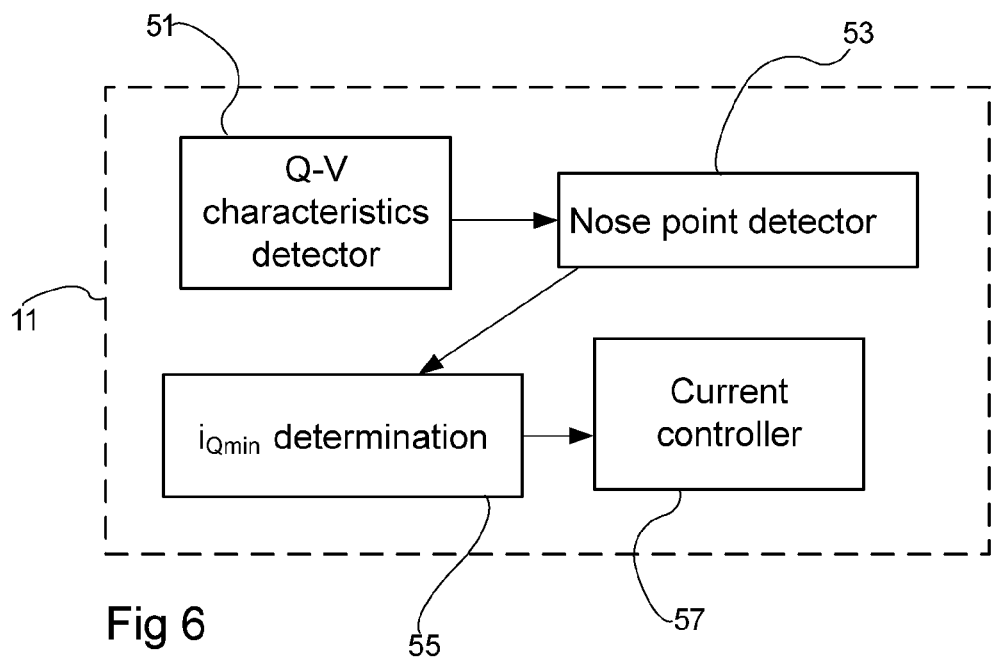
FIG. 6 schematically illustrates a wind power generation system controller.

A reactive power regulating means 11 (cf. FIG. 1) should comprise functional blocks for carrying out these actions. FIG. 6 illustrates a regulator comprising such blocks, namely a Q-V characteristics detector 51, a nose point detector 53, an $I_{Qmin}$ determination unit 55, and a current controller 57. Such blocks may typically be software implemented as routines executed on a digital signal processor even though various hardware configurations, e.g. utilizing applications specific integrated circuits, ASICs, would in principle also be conceivable.

Figure 4:
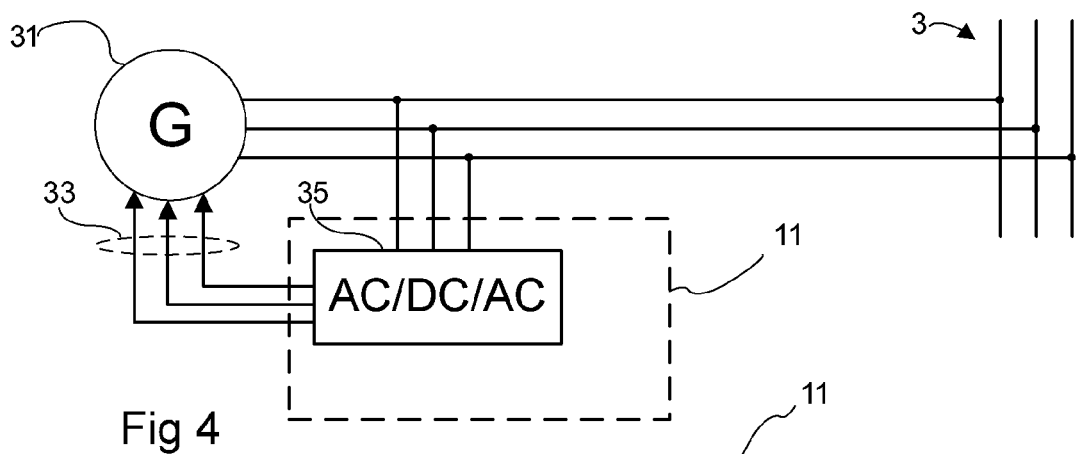
FIG. 4 shows a configuration of a wind power generation system with a doubly fed induction generator.

FIG. 4 shows a power conversion configuration with a doubly fed induction generator 31, connected to a wind turbine (not shown). A slip ring may be used to feed rotor currents 33 to the rotor. The rotor currents 33 may be provided by means of an AC/DC/AC converter 35 connected to the generator 31 output. Such doubly fed induction generators allow the rotor of the generator 31 to rotate with a varying rotation speed, out of synchronism with the grid frequency. Optionally, a transformer (not shown) may be placed between the grid 3 and the generator 31. Additionally, as is well known per se, the amount of active and reactive power that is fed to the grid 3 may be controlled by controlling the currents fed to the rotor windings of the generator 31. In such a context, the regulator 11 may then have the converter 35 as an integrated part, generating the rotor currents 33 that provide the desired amount of added reactive power.

Figure 5:
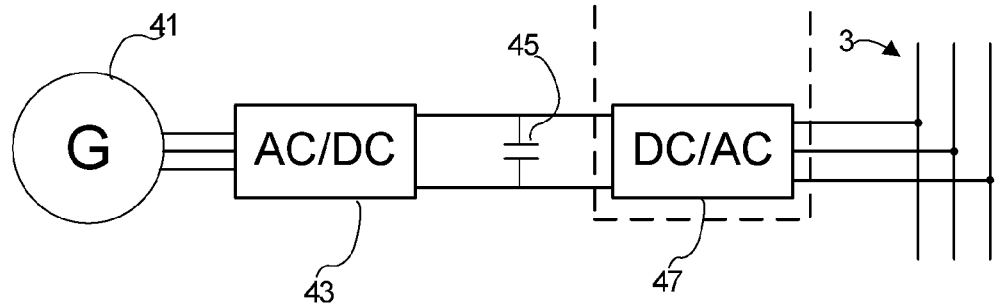
FIG. 5 shows a configuration of a wind power generation system with a full converter.

FIG. 5 shows a power conversion configuration for a synchronous generator 41, connected to a wind turbine (not shown). Then, a permanent magnet synchronous generator PMSG 41 is used together with an AC/DC/AC converter configuration 43, 45, 47. The converter configuration comprises an AC/DC converter 43, connected to the stator windings of the generator 41. The AC/DC converter 43 feeds DC power to a filter capacitor 45. A DC/AC converter 47 feeds power from the filter capacitor 45 to the grid 3. The amount of active and reactive power supplied to the grid may be controlled by controlling the switches of the DC/AC converter in the configuration, which forms part of the reactive power regulator 11.

As a further alternative, the reactive power regulator 11 may include a static VAR capacitor bank which may be used to control the reactive power produced. In principle, a rotating compensator could also be used in the same way.

The present disclosure is not limited to the described embodiments, it may be altered and varied in different ways within the scope of the appended claims.

What is claimed is:

1. A method for controlling a feed of reactive power in a wind power generation system to a grid, wherein the wind power generation system is connected to the grid at a point of connection, comprising:
   injecting a disturbance at the point of connection;
   determining a Q-V characteristic for the grid at the point of connection based on the injected disturbance at the point of connection, wherein the Q-V characteristic is a relation between reactive power injected to the grid at the point of connection and grid voltage at the point of connection;
   determining a minimum reactive current, $I_{Qmin}$; and
   controlling the feeding of reactive power to the grid based on the Q-V characteristic, wherein controlling the feeding of reactive power to the grid comprises maintaining the reactive current greater than the minimum reactive current, $I_{Qmin}$.

2. The method according to claim 1, wherein the method further comprises:
   determining a nose point for the Q-V characteristic,
   wherein the minimum reactive current, $I_{Qmin}$, corresponds to a point on the Q-V characteristic that is a predetermined distance from the nose point.

3. The method according to claim 1, wherein controlling the feeding of reactive power to the grid comprises:
   controlling rotor currents of a double fed induction generator (DFIG).

4. The method according to claim 1, wherein controlling the feeding of reactive power to the grid comprises:
   controlling switches of an alternating current/direct current/alternating current (AC/DC/AC) converter configuration connecting a generator with the grid.

5. The method according to claim 1, wherein determining the Q-V characteristic for the grid and controlling the feeding of reactive power to the grid occurs while the wind power generation system is operating in a transient state.

6. The method according to claim 1, wherein determining the Q-V characteristic for the grid and controlling the feeding of reactive power to the grid occurs while the wind power generation system is operating in a steady state.

7. The method of claim 1, wherein the Q-V characteristic is represented by a parabolic function with the form: $a*Q=V^2+b*V+c$.

8. The method of claim 1, wherein injecting a disturbance at the point of connection comprises:
injecting current at the point of connection.

9. The method of claim 8, wherein determining the Q-V characteristic for the qrid comprises:
increasing the injected current to determine parameter a, parameter b, and parameter c from a parabolic function representing the Q-V characteristic: $a*Q=V^2+b*V+c$.

10. The method of claim 9, further comprising:
determining a nose point for the Q-V characteristic by determining a point on the parabolic function representing the Q-V characteristic having a derivative that is substantially equal to zero.

11. A controller for controlling a feed of reactive power in a wind power generation system to a grid, wherein the wind power generation system is connected to the grid at a point of connection, comprising:
a power regulator configured to inject a disturbance at the point of connection;
a Q-V characteristic detector for determining the Q-V characteristic for the grid at the point of connection based on an injected disturbance at the point of connection, wherein the Q-V characteristic is a relation between reactive power injected to the grid at the point of connection and grid voltage at the point of connection;
a determination unit for determining a minimum reactive current, $I_{Qmin}$; and
a current controller configured to feed reactive power to the grid based on the Q-V characteristic,
wherein the current controller is configured to maintain the reactive current greater than the minimum reactive current, $I_{Qmin}$.

12. The controller according to claim 11, wherein the controller further comprises:
a nose point detector for detecting a nose point of the Q-V characteristic
wherein the minimum reactive current, $I_{Qmin}$, corresponds to a point on the Q-V characteristic that is a predetermined distance from the nose point.

13. The controller of claim 11, wherein the controller is further configured to control switches of an alternating current/direct current/alternating current (AC/DC/AC) converter configuration.

14. The controller of claim 11, wherein the controller is further configured to operate when the wind power generation system in a transient state.

15. The controller of claim 11, wherein the controller is further configured to operate when the wind power generation system in a steady state.

16. The controller of claim 11, wherein the Q-V characteristic is represented by a parabolic function with the form: $a*Q=V^2+b*V+c$.

17. The controller of claim 11, wherein the power regulator is further configured to inject current at the point of connection.

18. The controller of claim 17, wherein the power regulator is further configured to increase the injected current to determine parameter a, parameter b, and parameter c from the parabolic function of the Q-V characteristic: $a*Q=V^2+b*V+c$.

19. The controller of claim 18, wherein the nose point detector is configured to detect a point on the parabolic function of the Q-V characteristic with a derivative that is substantially equal to zero.

20. A method for controlling a feed of reactive power in a wind power generation system to a grid, wherein the wind power generation system is connected to the grid at a point of connection, comprising:
injecting a disturbance at the point of connection;
determining a Q-V characteristic for the grid at the point of connection based on the injected disturbance at the point of connection,
wherein the Q-V characteristic is a relation between reactive power injected to the grid at the point of connection and grid voltage at the point of connection, and
wherein the Q-V characteristic is represented by a parabolic function with the form: $a*Q=V^2+b*V+c$;
determining a minimum reactive current, $I_{Qmin}$; and
controlling the feeding of reactive power to the grid based on the Q-V characteristic, wherein controlling the feeding of reactive power to the grid comprises maintaining the reactive current greater than the minimum reactive current, $I_{Qmin}$.

* * * * *